(12) United States Patent
Piersol et al.

(10) Patent No.: US 8,904,197 B2
(45) Date of Patent: Dec. 2, 2014

(54) POWER MANAGEMENT BASED ON COMBINED USER INTERFACE AND SENSOR INPUTS

(75) Inventors: Kurt W. Piersol, Campbell, CA (US); Kanae Amemiya, Menlo Park, CA (US); Bradley J. Rhodes, Alameda, CA (US); Edward L. Schwartz, Sunnyvale, CA (US); Kenneth F. Gudan, Sunnyvale, CA (US)

(73) Assignee: Ricoh Co., Ltd., Tokyo (JP)

( * ) Notice: Subject to any disclaimer, the term of this patent is extended or adjusted under 35 U.S.C. 154(b) by 806 days.

(21) Appl. No.: 13/042,235

(22) Filed: Mar. 7, 2011

(65) Prior Publication Data

US 2012/0233482 A1    Sep. 13, 2012

(51) Int. Cl.
*G06F 1/32* (2006.01)
*G06F 1/26* (2006.01)

(52) U.S. Cl.
CPC ............ *G06F 1/3287* (2013.01); *G06F 1/3265* (2013.01); *Y02B 60/1242* (2013.01)
USPC ........... 713/300; 713/320; 713/323; 713/324; 455/127.5

(58) Field of Classification Search
CPC ....... G06F 1/32; G06F 1/3203; G06F 1/3206; G06F 1/3215; G06F 1/3221; G06F 1/3224; G06F 1/325; G06F 1/3268; G06F 3/0625; G06F 3/0629; G06F 3/0631; G06F 3/0632; G06F 3/0634; G06F 11/2089; G06F 3/0647; G06F 3/1221; G06F 11/2094; G06F 1/3209; G06F 1/3287; G06F 1/3265; Y02B 60/1242; Y02B 60/32; Y02B 60/34; Y02B 60/35; H04L 12/12; H04L 12/28; H04L 12/40039
USPC ................. 713/300, 310, 320–324, 330, 340; 455/127.5
See application file for complete search history.

(56) References Cited

U.S. PATENT DOCUMENTS

| | | | |
|---|---|---|---|
| 2003/0032464 A1* | 2/2003 | Sprigg et al. .................. | 455/574 |
| 2005/0060588 A1* | 3/2005 | Araki ............................ | 713/300 |
| 2006/0053311 A1* | 3/2006 | Chary ........................... | 713/300 |
| 2011/0185209 A1* | 7/2011 | Shimotono ................... | 713/323 |
| 2012/0017105 A1* | 1/2012 | Thyni et al. ................... | 713/323 |
| 2012/0204050 A1* | 8/2012 | Miyoshi et al. ............... | 713/323 |

* cited by examiner

*Primary Examiner* — Fahmida Rahman
(74) *Attorney, Agent, or Firm* — Patent Law Works LLP

(57) ABSTRACT

Power usage of a portable computing device is modified to more efficiently use a power supply included in the portable computing device. Power usage by different components of the portable computing device is modified based on use of the portable computing device to allow dynamic modification of power consumption. The portable computing device includes data describing various power management states and the portable computing device transitions between different power management states as it is used, modifying the power consumption of various components in different power management states. Various communication device operating states are also defined to modify power usage by communication devices included in the portable computing device based on device usage.

20 Claims, 8 Drawing Sheets

POWER MANAGEMENT BASED ON COMBINED USER INTERFACE AND SENSOR INPUTS

BACKGROUND OF THE INVENTION

1. Field of the Invention

The present embodiment of invention relates to portable computing devices and, in particular, to managing power consumption of a portable computing device based on workflow of the portable computing device.

2. Description of the Background Art

The use of portable computing devices has become commonplace for many users. In addition to having a conventional desktop computer, many users also have some type of portable computing device. Examples of present-day computing devices include electronic devices for reading. Smaller portable computing devices include a plethora of smart phones. There have also been increased sales of notebook laptops and tablet computers offering different levels of processing capability and size.

Portable computing devices commonly send and receive data using wireless communication. Accordingly, most portable computing devices include one or more wireless transceivers to transmit and receive data using one or more wireless networks. For example, many current portable computing devices include a transceiver for transmitting and receiving data using a network compliant with the International Mobile Telecommunications-2000 (IMT-2000) standard, commonly called a "3G network" and a second transceiver for transmitting and receiving data using a Wireless Fidelity network, commonly called a "WiFi network." However, operating multiple transmitters increases the power consumed by a portable computing device, often draining the portable computing device's battery more rapidly. To improve battery life, many portable computing devices allow different wireless transceivers to be disabled, which limits the network connectivity of the portable computing device while increasing its battery life. For example, a portable computing device may manually disable a 3G transceiver while leaving a WiFi transceiver enabled. As 3G transceivers generally consume more power, such a modification would extend the battery life of the portable computing device. However, conventional techniques for enabling and disabling transceivers require users to manually enable and disable transceivers, increasing complexity and requiring active user involvement as the location or operation of the portable computing device changes.

Display devices and other components also further increase the power consumption of portable computing devices. Conventionally, users manually modify the operation of a display device by reducing brightness or specifying time intervals after which the display device enters a power saving mode or turns off or modify whether or not different components are turned on to manage power consumption. However, these actions require a specific user interaction to modify display device or other component operation. Like manually enabling or disabling transceivers, manual modification of a display device, or of another component, increases user complexity and requires a user to remember what has been done to a display device or other component and to frequently modify display device or other component operation as use of the portable computing device changes.

SUMMARY OF THE INVENTION

The present invention overcomes the deficiencies and limitations of the prior art by providing a hardware implemented method for device power management based on device workflow. A device stores data describing various power management states and transitions between the power management states depending on use of the device. In different power management states, power from a power supply in the device is used by different components of the device or components of the device use different amounts of power in different power management states. In one embodiment, the device transitions from an off state where a power supply does not supply power to a display device, a communication unit, a second input device and a processor to a ready state responsive to a first input device receiving an input. For example, a user depresses a button to transition from the off state to the ready state. In the ready state, the power supply supplies a first amount of power to the processor and supplies power to the display device, the second input device and the communication unit in the ready state. If a memory included in the device includes data for display using the display device, the device transitions from the ready state to an active state, where the data is written to the display device and the power supplied to the processor from the power supply is increased from a first amount to a second amount.

While in the ready state, if the first input device receives a first type of input, the device transitions to the off state. For example, if a first input button is depressed for a specified time interval, the device transitions from the ready state to the off state. If the first input device receives a second type of input, however, the device transitions from a ready state to a sleep state. In the sleep state, the power supply ceases to supply power to the display device, the communication unit and the second input device while the power supplied to the processor is also decreased. For example, if the first input button is depressed for less than the specified time interval, the device transitions from the ready state to the sleep state. While in the ready state, if the second input device and the display device do not receive input for a predetermined length of time, the device transitions from the ready state to a dozing state. In the dozing state, the power supply ceases to supply to the communication unit and decreases the power supplied to the processor. For example, if the device is not moved for several minutes so an accelerometer does not receive input and a user does not interact with the display device for several minutes, the device transitions from the ready state to the dozing state.

While in the dozing state, if the second input device receives an input, the device transitions from the dozing state to the ready state. For example, if the device is physically moved while in the dozing state, the device transitions from the dozing state to the ready state. If the first input device receives the second type of input while the device is in the dozing state, the device transitions from the dozing state to the sleep state. If the first input device receives the first type of input while the device is in the dozing state, the device transitions from the dozing state to the off state. For example, if a first button is depressed for a specified length of time while the device is in the ready state, the device transitions to the off state while if the first button is depressed for less than the specified length of time while the device is in the ready state, the device transitions to the sleep state. While in the sleep state, if the first input device receives the second type of input, the device transitions to the ready state and transitions to the off state if the first input device receives the first type of input.

While in the active state, if the first input device receives the first type of input, the device transitions from the active state to the off state. For example, if a first button is depressed for a specified length of time, the device transitions from the active state to the off state. The device transitions from the active state to a sleep state responsive to the first input device receiving the second type of input while in the active state, and transitions from the active state to the ready state responsive to determining there is no data to display using the display device.

In one embodiment, the communication unit included in the device includes a first communication device and a second communication device, allowing the device to communicate with different networks using the different communication devices. To further improve power management, the device may transition between communication device operating states modifying power consumption by the first communication device and the second communication device. In one embodiment, the device operates in an asleep/off communication state where power is not supplied from the power supply to the display device, the processor, the first communication device and to the second communication device. Responsive to receiving an input, the device determines whether to operate in an airplane mode, and responsive to determining to operate in an airplane mode, power is supplied to the display device and the processor while power is not supplied to the first communication device and to the second communication device. However, responsive to determining not to operate in the airplane mode, the device operates in a wait state where power is supplied to the display device and the processor. In the wait state, a low amount of power is supplied to the first communication device power is not supplied to the second communication device.

Responsive to a location services trigger while operating in the wait state, the device operates in a second communication device locate state where power is not supplied to the first communication device but power is supplied to the second communication device. When the second communication device receives location information, the device operates in the wait state by ceasing power supplied to the second communication device and providing a low amount of power from the power supply to the first communication device.

While operating in the wait state, if the device receives an input to access an inbox or to submit a document, the device operates in a first communication device test state where a low amount of power is provided to the first communication device and power is not supplied to the second communication device. In the first communication device test state, the first communication device determines whether a first network is accessible to the first communication device. If the first network is accessible to the first communication device, the device operates in a first communication device synchronization state by increasing the power from the power supply to the first communication device. Data is transmitted to the first network using the first communication device and when data transmission is completed, the device reduces the power supplied to the first communication device to the low amount of power to operate in the wait state. However, if the first network is not accessible to the first communication device, the device determines whether the second communication device is enabled. If the second communication device is enabled, power is no longer supplied to the first communication device while power is supplied to the second communication device. Data is transmitted to a second network using the second communication device and when data transmission to the second network is completed, the device ceases power supplied to the second communication device and provides the low amount of power from the power supply to the first communication device to operate in the wait state.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION

Figure 1:
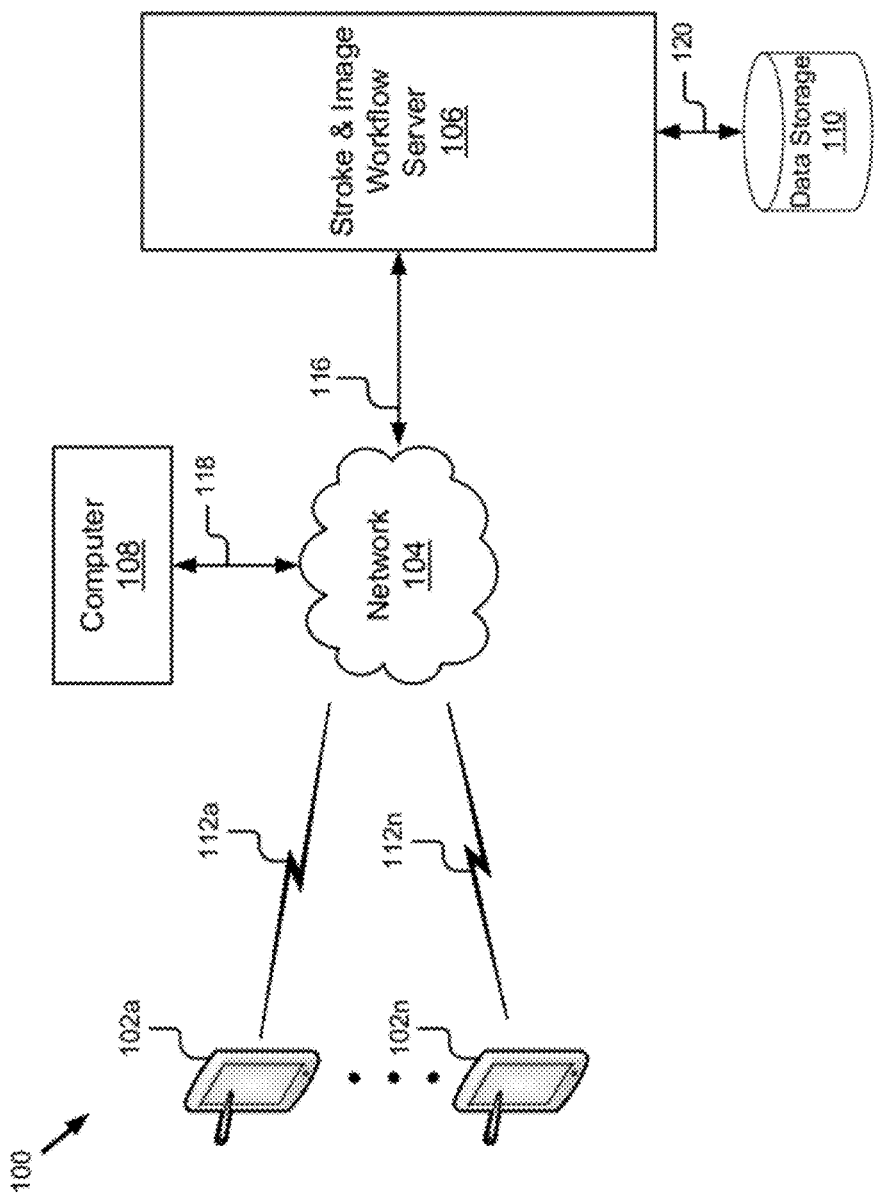
FIG. 1 is a block diagram of an embodiment of a system for stroke and image based workflow in accordance with the present embodiment of invention.

A system for managing power consumption of a device, such as a portable computing device, based on device workflow. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present embodiment of invention is described in one embodiment below with reference to portable computing devices that are exemplified in a hardware and software platform like the Amazon Kindle that utilize electronic paper, e-paper or electronic ink display. However, the present embodiment of invention applies to any type of portable computing device that can capture ink, data and commands, and send documents electronically.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present embodiment of invention is described below in the content of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present embodiment of invention is described with reference to a particular programming language. It will be appreciated that a variety of programming languages may be used to implement the teachings of the invention as described herein.

System Overview

FIG. 1 shows an embodiment of a system 100 for automatic stroke and image based workflow. Referring now to FIG. 1, this embodiment of system 100 comprises: a plurality of portable computing devices 102a-102n, a network 104, a computer 108, a stroke and image workflow server 106 and data storage 110.

The plurality of portable computing devices 102a-102n is wirelessly coupled to the network 104 via respective couplings 112a-112n. In one embodiment, the portable computing devices 102a-102n are portable computing devices including a display, stroke capture capability and a wireless communication capability. The portable computing devices 102a-102n are adapted to receive images (e.g., forms or documents), add stroke annotations to the received images, and send the annotated received images. Embodiments of the portable computing devices 102a-102n will be described in more detail below with reference to FIGS. 2 and 3.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, WAP, email, etc.

The computer 108 is a conventional type such as personal computer or hardware server. The computer 108 is coupled to the network 104 by signal line 118. In one embodiment, the computer can access and communicate with the stroke and image workflow server 106 to initially input a form for processing or verify processing of a particular form according to workflow. For example, a user may use the computer 108 to input to the stroke and image workflow server 106 a document such as a PDF file for further processing. Similarly, the computer 108 may be the recipient of a completed form after all processing according to its workflow has been completed. Computer 108 may communicate with a verification module 430 (See FIG. 4) of the stroke and image workflow server 106 to verify the status or completion of processing of a particular form. Finally, Computer 108 might operate on an electronic document as an intermediate stage of a workflow, or even contain some of the capabilities of the stroke and image workflow server 106, and communicate directly with portable computing devices 102a-102n.

The stroke and image workflow server 106 is coupled to the network 104 via signal line 116 for communication with the portable computing devices 102a-102n. The stroke and image workflow server 106 includes a document transmission module 408, a workflow module 412, a logging module 416, and a verification module 430 (See FIG. 4). The stroke and image workflow server 106 sends and receives documents from the portable computing devices 102a-102n, maintains a log for verification, and implements a paper like workflow and processing the documents. This is particularly advantageous because the stroke and image workflow server 106 implements paper like workflow for the portable device user and handles the overhead of processing electronic documents so that the processing is invisible to the user.

The data storage 110 is coupled to the stroke and image workflow server 106 via signal line 120. In an alternate embodiment, data storage 110 is coupled to the stroke and image workflow server 106 by the network 104. For example, in such an alternate embodiment, the data storage 110 is an online storage Web service such as Amazon S3. The data storage 110 is a non-volatile memory device or similar permanent storage device and media. Data storage device 110 stores data and instructions for processor 302 and comprises one or more devices including a hard disk drive, a floppy disk drive, a CD-ROM device, a DVD-ROM device, a DVD-RAM device, a DVD-RW device, a flash memory device, or some other mass storage device known in the art. The data storage 110 is used to store information about workflow processing such as the processing logs.

Although the system of FIG. 1 shows only one stroke and image workflow server 106, it should be understood that there could be any number of additional workflow servers, for example dedicated to other functions, companies, institutions, organizational structures. A computing device 102a-n may communicate with more than one stroke and image workflow server 106. Particular pages or sections of a document could be associated with different workflow servers. Also, portions of a compound document can be forwarded rather than sending the entire compound document.

Portable Computing Device 102

Figure 2A:
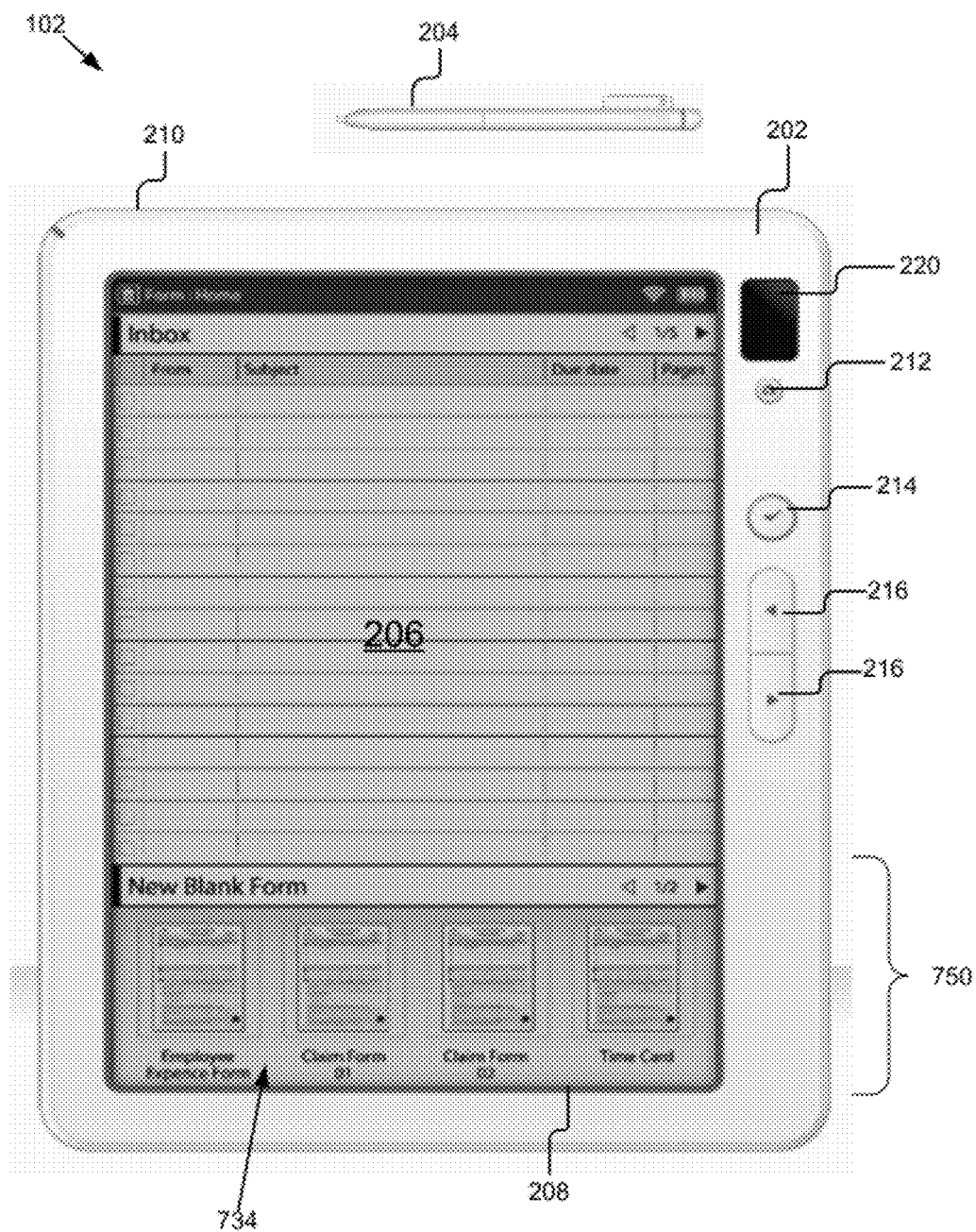
FIG. 2A is a front plan view of an embodiment of a portable computing device in accordance with the present embodiment of invention.
Figure 2B:
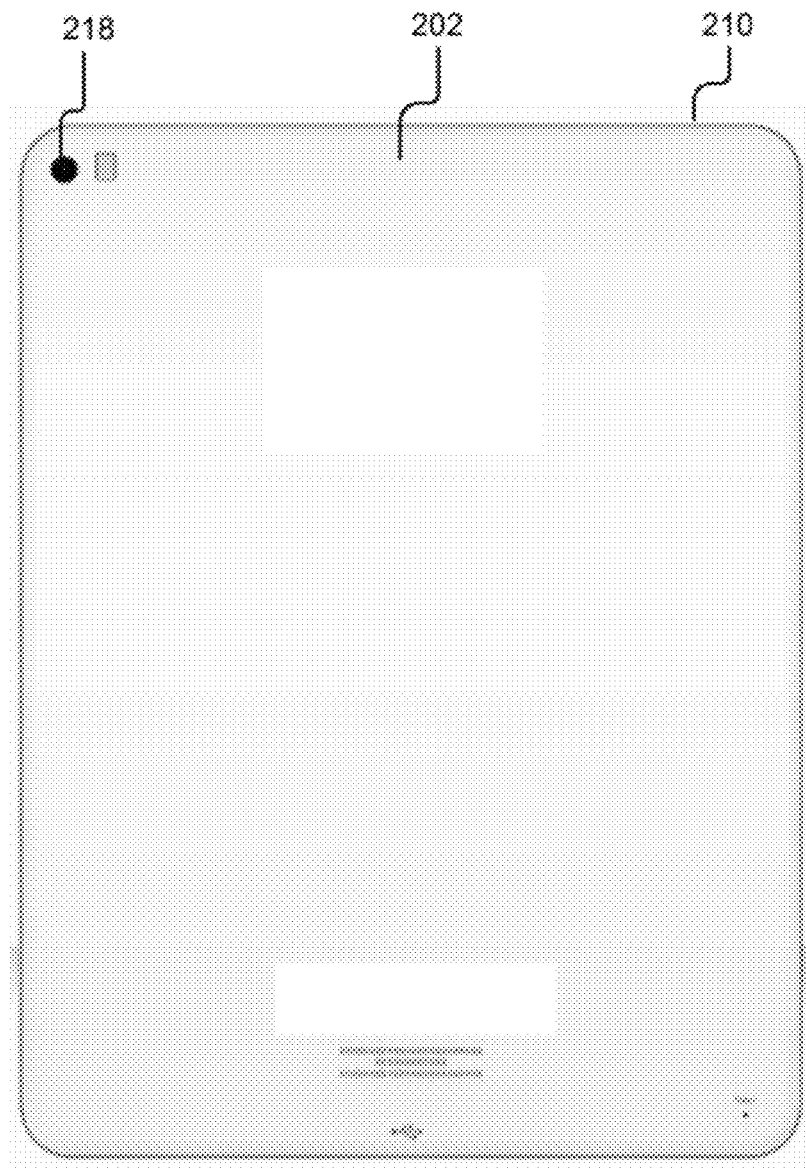
FIG. 2B is a back plan view of the embodiment of a portable computing device of FIG. 2A in accordance with the present embodiment of invention.
Figure 3:
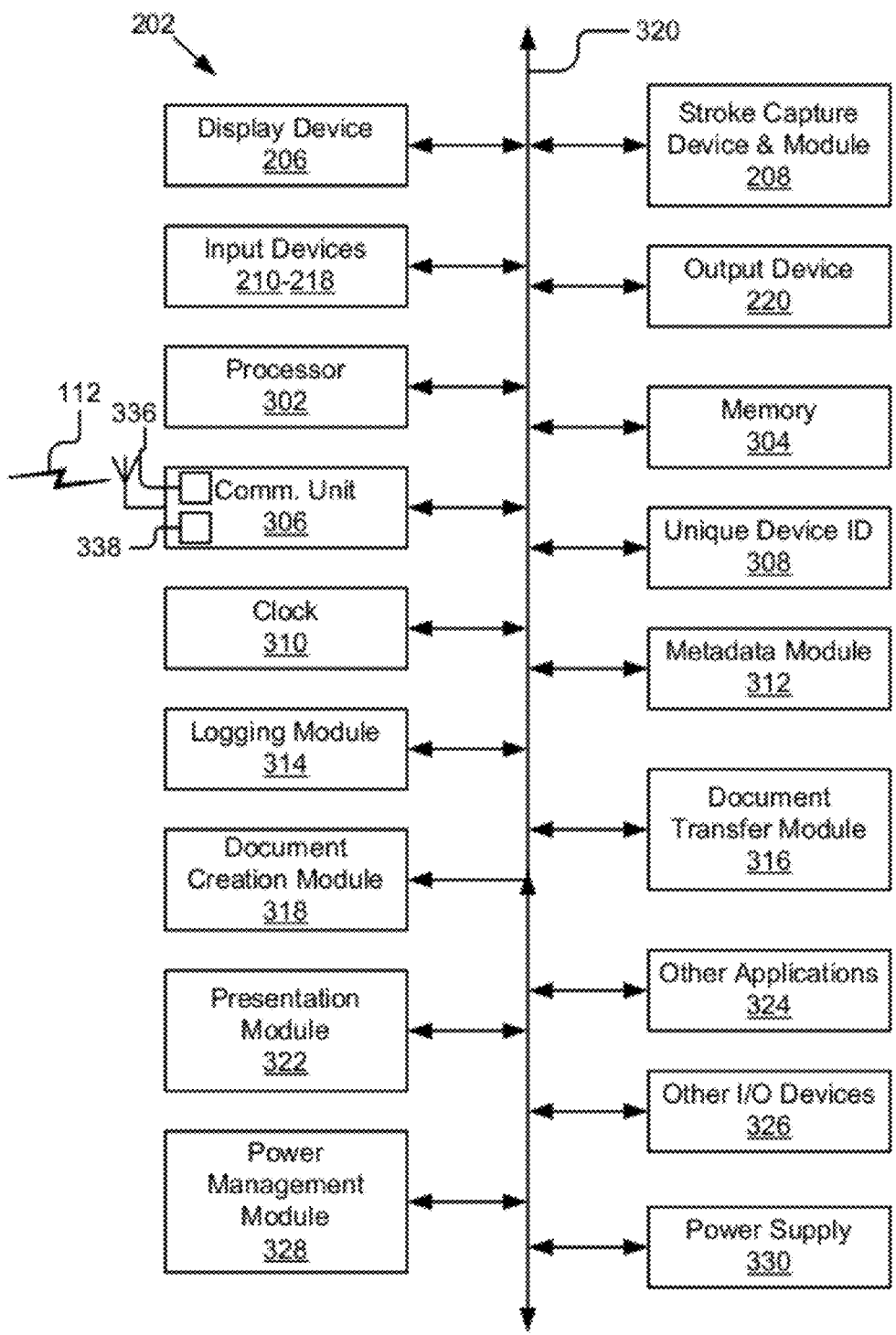
FIG. 3 is a block diagram of an embodiment of a portable computing device in accordance with the present embodiment of invention.

Referring now to FIGS. 2A, 2B and 3, an embodiment of the portable computing device 102 will be described in more detail. The portable computing device 102 comprises a computing pad 202 and a stylus 204. In an alternate embodiment, the portable computing device 102 may include only a computing pad 202 and users can use their finger or other pen-like object as a stylus. The computing pad 202 displays an image and records any strokes written on the image. The strokes are typically displayed immediately on top of the image, just as if written by pen on paper. The strokes are also typically captured as a sequence of points or segments. Usually some timing information is captured with the strokes and sometimes pressure information is captured. "Pen up" and "Pen down" may also be recorded with the strokes, indicating contact with the pad versus proximity to the pad. In some cases, the stylus 204 may have an identifier or a button or different "ends" and this can also be recorded with the strokes. In some cases, pen or stylus 204 velocity and/or pen acceleration are also recorded. In some cases other aspects of the pen or stylus 204 such as pen rotation or the angle of the pen to the display surface are recorded.

The computing pad 202 comprises a display device 206, a stroke capture device and module 208, a plurality of input devices 210-216, a camera 218, an output device 220, a processor 302, a memory 304, a communication unit 306, unique device identifier storage 308, a clock 310, a metadata module 312, a logging module 314, a document transfer module 316, a document creation module 318, a bus 320, a presentation module 322, other applications 324, other input/output (I/O) devices 326, a power management module 328 and a power supply 330.

Referring now to FIGS. 2A and 2B, one embodiment for the computing pad 202 is shown. In this embodiment, the display device 206 is an electronic paper display such as manufactured and sold by E-ink. In other embodiments, the display device 206 is a liquid crystal display (LCD) or any other similarly equipped display device, screen, or monitor. The display device 206 represents any device equipped to display electronic images and data as described herein. The display device 206 is sized sufficient to show at least a small 'page' of information. In different embodiments, the display is binary (only two different values for pixels), monochrome (multiple shades of one color), or allows multiple colors and shades. The display device 206 is preferably a light-weight low-power display. In one embodiment, the display device 206 uses reflective light rather than emitting light for use outdoors and uses less power. The display device 206 also has high resolution for displaying information that might otherwise be displayed on paper, but the device display device 206 tolerates update speeds much lower than the 60 Hz refresh rates common with LCD displays.

Aligned with the display device 206, there is a stroke capture device 208 such as a digitizing tablet or graphics pad. The stroke capture device 208 is a contact sensing device or a sonic, electromagnetic or light sensing device with receivers that could be above, below, or around the display. The stroke capture device 208 is capable of accepting strokes from the stylus 204 or a finger or other implement. The stroke capture device 208 is a sensor for the stylus 204 and has resolution sufficient to capture recognizable handwriting and printing and other drawings. In one embodiment, display device 206 is equipped with a touch screen in which a touch sensitive, transparent panel covers the screen of display device 206. In one embodiment, the stroke capture device 208 is a digitizer manufactured and sold by Wacom Co., Ltd. In another embodiment, the stroke capture device 208 is simple sensors that return horizontal and vertical position of a single point of contact. In yet another embodiment, the stroke capture device 208 is a plurality of more complex sensors that return an indication of pressure, location, time, and even a stylus 204 ID number or type or indication if a button is pressed on a stylus or the stylus has been inverted, e.g. to erase. Some sensors might return multiple points of contact. Some sensors might be able to distinguish between stylus and finger based touch input. The stroke capture device 208 is either part of or adapted to communicate with the stroke capture module 208.

In addition to the stylus 204, the computing pad 202 provides a plurality of input devices 210-216 to input commands. As shown in FIG. 2A, a first button 210 on the top edge of the computing pad 202 when selected turns the computing pad 202 on and off. In one embodiment, the first button 210 can be selected for a short duration, such as less than a specified time interval, to put the computing pad 20 in sleep mode, and depressed for a longer duration, such as for the specified time interval, to turn the computing pad 202 off. A second button 212 controls the operation of the camera 218 and when selected causes the camera 218 to capture an image. A third button 214 when selected indicates that annotation of a document is complete and the document should be sent by the computing pad 202. A fourth pair of input buttons 216 allows the user to transition to a next page or previous page, respectively, of a document. Those skilled the art will recognize that these input devices as buttons are merely one embodiment for the plurality of input devices 210-216 and that various other configurations of fewer or more buttons or input devices are within the spirit and scope of the present embodiment of invention. More specifically, in another embodiment, the computing pad 202 has very few (or no) buttons because buttons may interfere with the device being perceived as paper-like.

In such an embodiment, strokes and other metadata will be continuously transmitted as long as there is network connectivity. The completion of a page or set of pages might be indicated by pressing a 'submit' or 'reject' button on the pad, or there may be regions on the displayed page and adding strokes to those regions may cause submission of the appropriate data. Those skilled in the art will recognize that are a variety of different number and configurations for the plurality of input devices 210-216. For example, another configuration includes 1 button for power and one button for submit; a second example has a slider to choose a page among a large number of pages depending on the position of the finger and one or more buttons.

Referring now also to FIG. 2B, the back side of the computing pad 202 is shown. The computing pad 202 includes a camera 218 and an output device 220. As shown in FIG. 2B, the camera 218 is positioned with its lens facing outward on the back side of the computing pad 202 in the upper left-hand corner. The camera 218 is a conventional type such as those available on cell phones or notebook computers. The output device 220 is a device for displaying small images and is used as the camera's viewfinder. In one embodiment, the output device 220 is an organic light emitting diode (OLED) and is only operational when the camera is operational. In another embodiment, the output device 220 is used to indicate the status of the device such as: 1) whether the computing pad 202 has power and is operational; 2) whether the computing pad 202 has network connectivity; 3) whether the computing pad 202 is sending or receiving a compound document; etc. Those skilled in the art will recognize that there may be a variety of additional status indicators beyond those listed above that may be part of the output device 220, or that status might be provided through the main display 206.

Referring now to FIG. 3, the remaining components of the computing pad 202 are described.

The processor 302 comprises an arithmetic logic unit, a microprocessor, a general purpose controller or some other processor array to perform computations, provide electronic display signals to display device 206, and detect and process stroke inputs. The processor 302 is coupled to the bus 320 for communication with the other components of the computing pad 202. Processor 302 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included. The processing capability of the computing pad 202 may be limited to supporting the display of images and the recording strokes and the transmission of strokes. The processing capability might be enough to perform more complex tasks, including various types of image processing, stroke processing, or recognition tasks. It will be obvious to one skilled in the art that other processors, operating systems, sensors, displays and physical configurations are possible. The computing pad 202 also includes an operating system executable by the processor such as but not limited to WINDOWS®, MacOS X, Android, or UNIX® based operating systems.

The memory 304 stores instructions and/or data that may be executed by processor 302. The instructions and/or data may comprise code for performing any and/or all of the techniques described herein. The memory 304 may be a dynamic random access memory (DRAM) device, a static random access memory (SRAM) device, flash memory or some other memory device known in the art. In one embodiment, the memory 304 also includes a non-volatile memory such as a hard disk drive or flash drive for storing log information on a more permanent basis. The memory 304 is coupled by the bus 320 for communication with the other components of the computing pad 202.

The communication unit 306 is coupled to an antenna and to the bus 320. In an alternate embodiment, the communication unit 306 may provide a port for direct physical connection to the network 104. The communication unit 306 includes one or more transceivers for sending and receiving compound documents. In one embodiment, the communication unit 306 includes a Wi-Fi transceiver for wireless communication with an access point. In another embodiment, the communication unit 306 includes a Bluetooth® transceiver for wireless communication with other devices. In yet another embodiment, the communication unit 306 includes a cellular communications transceiver for sending and receiving data over a cellular communications network such as via short messaging service (SMS), multimedia messaging service (MMS), hypertext transfer protocol (HTTP), direct data connection, WAP, email, etc. In still another embodiment, the communication unit 306 includes ports for wired connectivity such as but not limited to USB, SD, or CAT-5, etc. The communication unit 306 links the processor 302 to the network 104 that may include multiple processing systems. The network of processing systems may comprise a local area network (LAN), a wide area network (WAN) (e.g., the Internet), and/or any other interconnected data path across which multiple devices may communicate. The communication unit 306 also provides other conventional connections to the network 104 for distribution of files (media objects) using standard network protocols such as TCP/IP, HTTP, HTTPS and SMTP as will be understood to those skilled in the art.

In one embodiment, the communication unit 306 includes different communication devices 336, 338. For example, the communication unit 306 includes different wireless transceivers, allowing the communication unit 306 to send and receive data using different types of wireless networks using different types of wireless transceivers. Examples of the first communication unit 336 or the second communication unit 338 include a WiFi transceiver, a 3G transceiver, a near-field communication transceiver, a WiMax transceiver, a global positioning system (GPS) transceiver or transponder, a 4G transceiver, a BLUEOOTH® transceiver or any other suitable communication device. In the example shown by FIG. 3, the communication unit 306 includes a first communication device 336 and a second communication device 338. For example, the first communication device 336 is a WiFi transceiver and the second communication device 338 is a 3G transceiver; hence, in this example the computing pad 202 is able to transmit and/or received data using a WiFi network or a 3G network by using the first communication device 336 or the second communication device 338, respectively. In different embodiments, the communication unit 306 includes a greater or fewer number of communication devices 336, 338.

The computing pad 202 includes storage for a unique device identifier 308. The computing pad 202 is coupled to the bus 320 to provide the unique identifier to other components as needed. In one embodiment, the storage is read only memory for storing the unique device identifier 308. In another embodiment, the unique identifier storage 308 is a nonvolatile storage storing a public key-private key pair. In another embodiment, the public key-private key pair is stored within a specialized trusted computing memory integrated with the CPU or main board of the device. It is useful for the computing pad 202 to have a unique identifier that is used to indicate where strokes were recorded or for various communication protocols. In one embodiment, the unique identifier is the hardware MAC address of a network chip in the computing pad 202. The unique identifier 308 may be an internal part of another functional block, such as the communication unit 306, or in nonvolatile storage in memory unit 304. In another embodiment, the unique identifier is a unique ID associated with a memory card on the computing pad 202, in that way association with a particular device would move to a different device when the memory card is moved, which might be an expected behavior. Unique identifiers are useful for a variety of operations, but typically do not provide much security. Hardware MAC addresses for example can be imitated by other devices. Thus it is sometimes valuable to have a device associated with a pair of keys from a public key cryptography system, such as RSA®. In one embodiment, the computing pad 202 is manufactured with or configured with a private key and the public key disseminated. Then the computing pad 202 can use its private key for digital signatures of strokes, images, logs, or other media originating on the device. Others may use the public key to verify such media. The public key may also be used to provide secret communication with the device. Use of the device public key for encryption will limit the access of others to page images or metadata intended solely for a particular computing pad 202.

The clock 310 is a conventional type and provides an indication of local time for the computing pad 202. In particular, the clock 310 is used to provide a local time at which compound documents are processed. This time value is also stored with data in the local log files using the logging module 314. The clock 310 is adapted to communicate this information to the processor 302 and the logging module 314 using the system bus 320.

The metadata module 312 is software including routines for extracting metadata from a document and storing metadata as part of a document. In one embodiment, the metadata module 312 is instructions executable by the processor 302 to provide the functionality described below with reference to FIGS. 5-9 for accessing both image/page metadata as well as document metadata. In another embodiment, the metadata module 312 soft routines for presenting the user interfaces, capturing stroke information, and routing (sending documents from and receiving at the portable computing device 102) documents according to the workflow. In one embodiment, the metadata module 312 is stored in the memory 304 and is accessible and executable by the processor 302. In any event, the metadata module 312 is adapted for cooperation and communication with the processor 302 and other components of the computing pad 202.

The logging module 314 is software including routines for creating and storing local logs in the memory 304, and more particularly, in a nonvolatile storage portion of the memory 304. In one embodiment, the logging module 314 is a set of routines executable by the processor 302 to store metadata in an entangled log at the computing pad 202 and the stroke and image workflow server 106. The logging module 314 is particularly critical to provide verification of workflow completion in transactions. In one embodiment, the logging module 314 also includes routines for publishing or storing in a publicly available location on the network the logs of its particular computing pad 202. The logging module 314 is coupled by the bus 320 to the processor 302, the memory 304, and the communication unit 306.

The document transfer module 316 is software and routines for transmitting and receiving documents from the stroke and image workflow server 106. In other embodiments, the document transfer module 316 sends and receives documents as formatted messages from any other computing device such as but not limited to the computer 108, the stroke and image workflow server 106 or other portable computing devices 102. The document transfer module 316 is coupled by the bus 320 for communication with the processor 302 and the communication unit 306. The document transfer module 316 is responsible for transmitting and receiving the document or formatted message from the computing pad 202 such as by email, file transfer, XMPP or special purpose application.

In a first embodiment, the document transfer module 316 is client software operational on the computing pad 202 that maintains a directory structure that serves as an inbox. The document transfer module 316 moves documents from a corresponding inbox on the stroke and image workflow server 106 to this directory. Once a document in the inbox of the computing pad 202 has been annotated and the user inputs the submit instruction, the document transfer module 316 removes the document from the directory structure and transfers it to the stroke and image workflow server 106 for further processing.

In a second embodiment, the document transfer module 316 is an e-mail client that is capable of receiving and sending e-mails having attachments. The e-mail client is operable on the processor 302. Mail servers commonly use either the POP or IMAP protocols to talk to mail clients, and the computing pad 202 is configured to use either. The messages are in a format the computing pad 202 can directly use, e.g. an attachment of image files. The messages are in a format that requires conversion on the computing pad 202, e.g. a pdf document. Alternatively, a special mail server could provide conversion of messages so that the pad does not need to support multiple formats. In the case of multiple devices being used in a workflow to distribute work that must only be done once e.g. as in the departmental in-box described above, using IMAP is advantageous. Multiple devices 102a-n may be configured as clients with the same IMAP server and 'username.' The group of devices 102a-n might display all forms in the "inbox." Once any user on any device 102a-n marks the form as 'processed' the device moves the message out of the 'inbox' and perhaps into a 'processed' box on the IMAP server. When the other devices 102a-n check the "inbox" on the IMAP server, they will determine that the pages are no longer present and will no longer display them. When a pad needs to send a page or strokes or multiple pages and strokes, the pad can act as an email client and send mail, perhaps with the pages in a directory structure that has been compressed and combined into a single file.

In a third embodiment, the document transfer module 316 is a routine for performing file transfer. Various file transfer methods can be used to move documents on and off the computing pad 202. The computing pad 202 could run an ftp, http, or webdav server and other devices could push or pull documents on the computing pad 202. The computing pad 202 could also be configured to get or post new documents to an external server, again via ftp, http, rsync, webdav, or another protocol.

In a fourth embodiment, the document transfer module 316 is a client communication program such as for communicating via MMS or on other communications protocols. XMPP, a protocol used in instant messaging, is used to provide document and stroke communication with a pad. Instant messaging protocols are useful because any member of the messaging group can initiate a message, even while another member is transmitting a message. For the computing pads 202 this allows a service to transmit an image for the pad at the same time as strokes are being transmitted from the pad to server. Instant messaging protocols can also be useful if a group of computing pads 202 is sharing a display space and thus all members of the group may be informed of new strokes.

In a fifth embodiment, the document transfer module 316 is a custom application. Of course, information may be transferred to the computing pad 202 with special purpose applications designed to work with the pad using a pad specific API. An instructor might want to "drag and drop" a worksheet onto a graphical representation of a pad without knowing the specific method used to move the file. In one example embodiment, the document transfer module 316 is rsync. Rsync is a data transfer software application for Unix that synchronizes files and directories from one location to another while minimizing data transfer using delta encoding when appropriate. In the embodiments noted above, the document transfer module 316 might be implemented a store and forward system which opportunistically transmits the documents only when network connectivity is available.

The document creation module 318 is software or routines for creating new documents. The document creation module 318 is operable on the processor 302 and is coupled to the bus 320 for communicating with the other components of the computing pad 202. The document creation module 318 is responsive to signals from the input devices 210-218 or the stroke capture device 208. The document creation module 318 stores template forms of documents in the memory 304. In response to user input, the document creation module 318 accesses the stored template forms and copies the selected one to create a new document from the template form. Once created, the document stored in memory 304, is added to the inbox list maintained by the presentation module 322, and is otherwise editable, manipulatable and transmittable just like any other document.

The bus 320 represents a shared bus for communicating information and data throughout the computing pad 202. The bus 320 may represent one or more buses including an industry standard architecture (ISA) bus, a peripheral component interconnect (PCI) bus, a universal serial bus (USB), or some other bus known in the art to provide similar functionality. Additional components coupled to processor 302 through system bus 320 include the display device 206, the stroke capture device and module 208, the plurality of input devices 210-216, the output device 220, the processor 302, the memory 304, the communication unit 306, the unique device identifier storage 308, the clock 310, the metadata module 312, the logging module 314, the document transfer module 316, the presentation module 322 and the other applications 324. There may also be a plurality of busses in computing system 202, designed to provide the most efficient communications between functional elements.

The presentation module 322 is software and routines for displaying documents and the inbox on the display device 206, and adjusting the display of the image responsive to input from input devices 210-216. The presentation module 322 performs routines that cause the dual mode user interface described below with reference to FIGS. 5-9 to be displayed. In one embodiment, the presentation module 322 is a thin client routine executable by the processor 302 to cause display of the image on the display device 206. The presentation module 322 is coupled by the bus 320 to the display device 206, the processor 302, and the memory 304.

The other applications 324 include other software and routines executable by the processor 302 for various other types of functionality. In one embodiment, one or more application programs are executed by the processor 302 including, without limitation, word processing applications, electronic mail applications, financial applications, and web browser applications.

The computing pad 202 may include one or more other I/O devices 326. For example, the other I/O devices 326 may include speakers to produce sound, microphones to record sound, a scanner or camera to record documents or images, and other sensors or feedback devices like accelerometers, pager motors, or haptic feedback. In one embodiment, the computing pad 202 includes one or more accelerometers for detecting movement of the computing pad 202. Optionally, the other I/O devices 326 may include one or more analog-to-digital or digital-to-analog converters, and/or one or more digital signal processors to facilitate audio processing. These other I/O devices 326 are coupled by bus 320 for communication with the processor 302 and the memory 304. Optionally, a microcontroller may be added as part of other I/O Devices 326 to facilitate power systems control, as well as off-load the main processor 302 from lower-speed lesser-important tasks.

Figure 6:
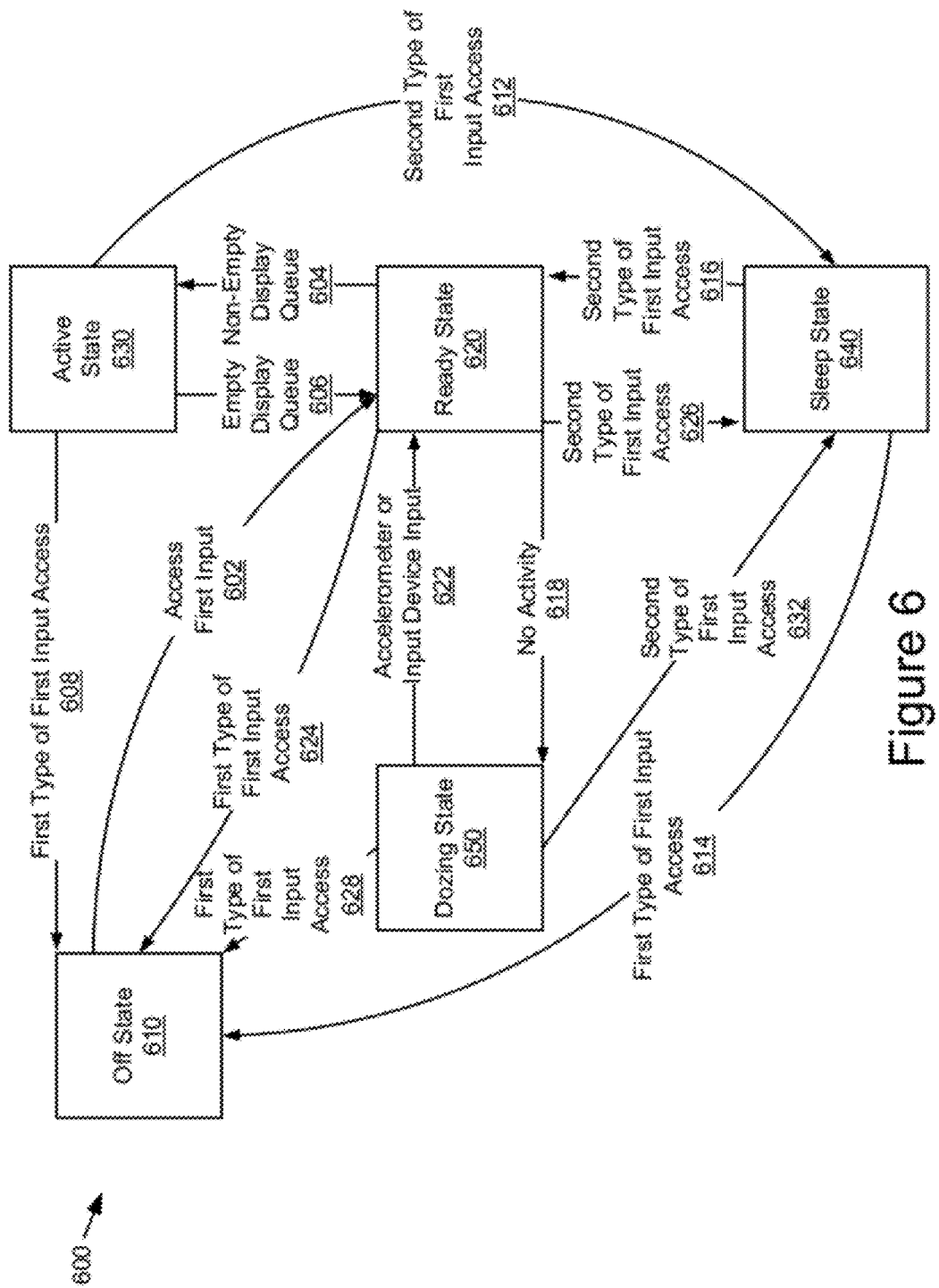
FIG. 6 is a state diagram describing power management states of a device in accordance with the present embodiment of invention.
Figure 7:
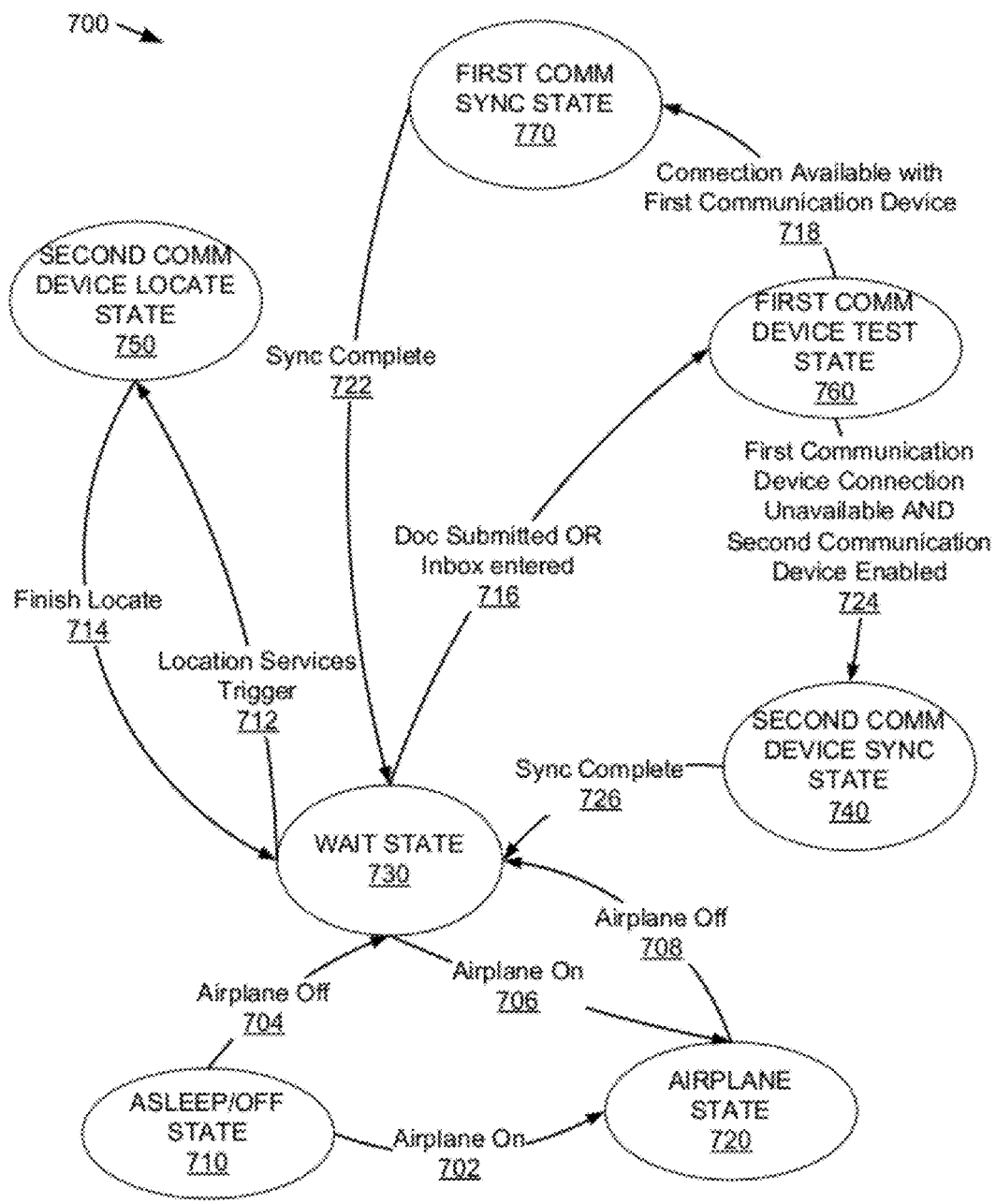
FIG. 7 a state diagram describing operating states of communication devices of a device in accordance with the present embodiment of invention.

The power management module 328 is data that, when executed by the processor 302 modifies power consumption of one or more components of the computing pad 202. In one embodiment, the power management module 328 is data stored in a computer-readable storage medium, such as the memory 304, for execution by the processor 302. Alternatively, the power management module 328 is one or more hardware devices configured to modify the power consumption of components of the computing pad 202. For example, the power management module 328 comprises one or more application specific integrated circuits (ASICs) and/or one or more field programmable gate arrays (FPGAs) coupled via the bus 320. The power management module 328 including data describing different states of the computing pad 202 and/or states of one or more components of the computing pad 202 as well as data describing transitions between the different states. For example, the power management module 328 includes data describing operating states of the communication unit 306 and data describing power management states of the computing pad 202. In different states, power consumption of components of the computing pad 202 is modified, so transitioning between states as described by the power management module 328 increases the efficiency with which the computing pad 202 uses power. FIGS. 6 and 7, further described below, describe examples of state machines and state transitions stored by the power management module 328 for managing power consumption of the computing pad 202.

The power supply 330 supplies electrical energy to components of the computing pad 202. In one embodiment, the power supply 330 comprises a battery or another suitable energy storage device. The power supply 330 directs energy, such as stored electrical energy, to various components of the computing pad 202, such as the display device 206, the input devices 210-218, the processor 302, the communication unit 306, the output device 220 and/or different and or additional components of the computing pad 202. In one embodiment, the power supply 330 stores a quantity of electrical energy and the processor 302 and the power management module 328 regulate or modify how the stored electrical energy is distributed from the power supply 330 to various components of the computing pad 202.

Stroke and Image Workflow Server 106

Figure 4:
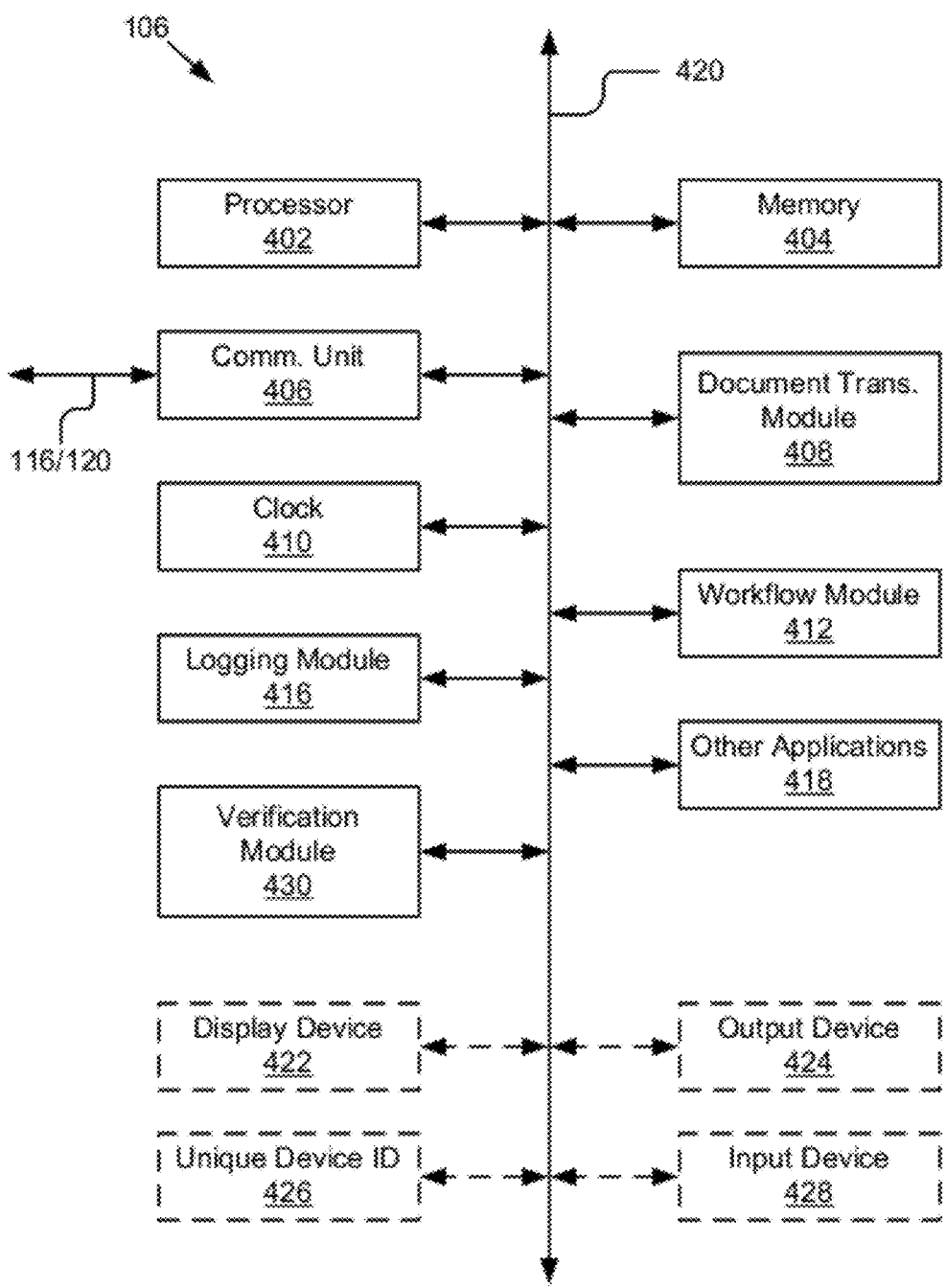
FIG. 4 is a block diagram of an embodiment of a stroke and image workflow server in accordance with the present embodiment of invention.

Referring now to FIG. 4, an embodiment of a stroke and image workflow server 106 will be described in more detail. The stroke and image workflow server 106 comprises a processor 402, a memory 404, a communication unit 406, a document transfer module 408, a clock 410, a workflow module 412, a logging module 416, other applications 418, a bus 420 and a verification module 430. In an alternate embodiment, the stroke and image workflow server 106 further comprises a display device 422, an output device 424, a unique device ID storage 426 and an input device 428.

Those skilled in the art will recognize that some of the components of the stroke and image workflow server 106 have the same or similar functionality to the components of the computing pad 202 so descriptions of these components will not be repeated here. For example, the processor 402, the memory, 404, the communication unit 406, the document transfer module 408, the logging module 416, the clock 410, the other applications 418, display device 422, output device 424, unique device ID 426 and input device 428 have a similar functionality to the processor 302, the memory 304, the communication unit 306, the document transfer module 316, the logging module 314, the clock 310, the other applications 324, display devices 206, output device 220, unique device ID 308, input devices 210-216 of FIG. 3, respectively. Some differences between the components of the stroke and image workflow server 106 and the computing pad 202 are noted below. For example, the communication unit 406 may couple the stroke and image workflow server 106 to the network 104 in a wired manner instead of wirelessly. The processor 402 is more computationally powerful than the processor 302 as the workflow server 106 likely services numerous portable computing devices 102. The document transfer module 408 is an e-mail server as opposed to an e-mail client. The display device 422 may be a CRT, and the output device 424 is speakers. The input device 428 includes a keyboard and mouse type controller. Those skilled in the art will recognize that there may be a variety of other differences as the components of the stroke and image workflow server 106 acts as a hardware server as opposed to a remote client.

The verification module 430 of the stroke and image workflow server 106 is software and routines for verifying the processing of a document. In one embodiment, the verification module 430 is routines executable by the processor 402 to perform verification of document processing as described below. The verification module 430 is coupled by bus 420 to the processor 402, the memory 404 and the communication unit 406. Note that the verification module 430 might be used independently of the stroke and image workflow server 106. In fact, it might run on the computer 108 for independent verification of documents without need to trust a particular server.

The workflow module 412 of the stroke and image workflow server 106 is software and routines for processing and routing documents or formatted messages. The workflow module 412 creates documents 400 or creates formatted messages. The workflow module 412 also works with the logging module 416 to create a system log (stored in the logging module 416, the memory 404 or the data storage 110) and publishes or makes available that log as needed. The workflow module 412 is also responsible for routing the document or formatted messages on to the next location as part of a processing workflow. In one embodiment, the computing pad 202 returns documents by submitting them or sends reply emails including attachments to the stroke and image workflow server 106, and the workflow module 412 determines the routing and next workflow step. It should be noted that the process of creating a system log by the workflow module 412 can create a entangled log, and that the presences of multiple workflow modules 412 servicing distinct pages of the document greatly increases the difficulty of tampering with the document without being detected. For example, a workflow server 106 might create a notepad document which will be transmitted to all meeting members after the end of a meeting. The notepad document would be created with a "next destination" URL containing a group email address. The workflow server 106 would route the document to each member of the group once the notepad is submitted back to the workflow server 106 by the tablet.

For convenience and ease of understanding, the forwarding of documents and the processing of documents within the workflow is described below as being performed by the workflow module 412 of the stroke and image workflow server 106; however, those skilled in the art will recognize that alternatively the same operations may be performed by the computing pad 202. Alternatively, those skilled in the art will recognize that the document routing process and workflow rules might be implemented by separate servers, instead of being implemented as one integrated server.

Those skilled in the art will recognize that there are a variety of ways that the workflow module 412 of the stroke and image workflow server 106 determines what to do with the document once it has been received from the computing pad 202 (submitted by the computing pad 202). In one embodiment, computing pads 202 are configured to work with a particular stroke and image workflow server 106 and submit a page to the stroke and image workflow server 106; for that page, the stroke and image workflow server 106 then determines the next step based on preprogrammed rules. In one embodiment, the stroke and image workflow server 106 determines how to process the document based upon on metadata stored inside the document itself. The metadata may specify additional processing of the document, how the document is to be routed, and to what other computing devices it is to be routed. For example, an ordered series of email addresses stored as metadata is one example of a workflow where the document will be passed to each successive email address. The metadata may also be provided on an entire document basis or a page basis.

In another embodiment, workflows are specified in the document or in the email (formatted message) in which the document was sent. In the simple case of receiving a document by email, the computing pad 202 returns the completed document to the stroke and image workflow server 106. The stroke and image workflow server 106 then extracts the metadata from the completed document, determines the next step in the workflow, and then sends the completed document to the device (e.g., computer 108) identified to perform the next step in the workflow. In an alternate embodiment, the computing pad 202 returns the completed document by e-mail to the stroke and image workflow server 106, and the e-mail includes the workflow. The stroke and image workflow server 106 determines the next e-mail address in which to send the completed document from the e-mail that included the completed document. In an alternate embodiment, HTTP headers could be used instead of or in addition to e-mail headers. If the documents are being transported in a manner that supports page images, strokes, and metadata, then the metadata can contain the workflow instructions and status. Again, in the simple case, the metadata includes a list of email address and the current step of the workflow.

Methods

Figure 5:
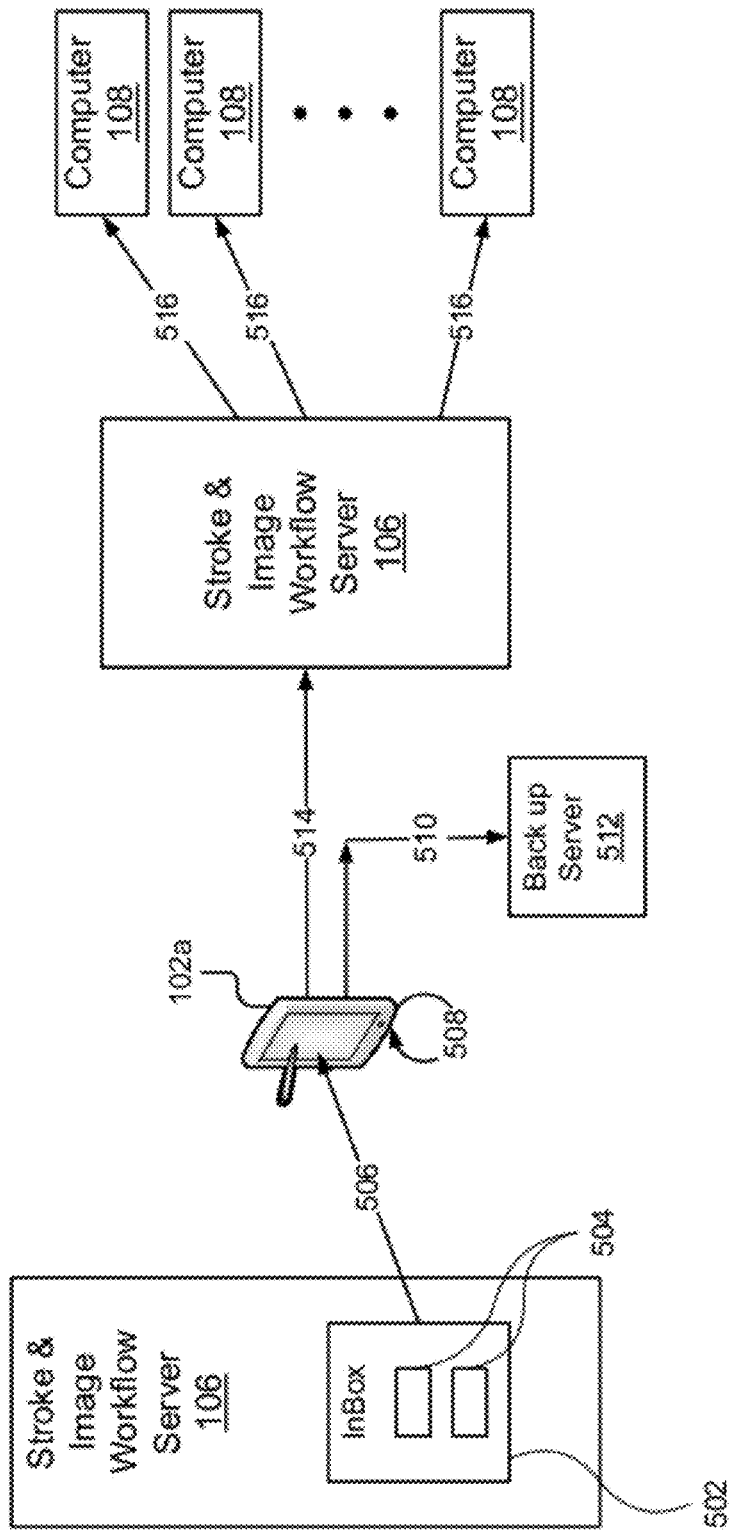
FIG. 5 is a schematic flow diagram illustrating the automatic document processing in accordance with the present embodiment of invention.

FIG. 5 shows one embodiment of an automatic document processing method in accordance with the present embodiment of invention. The process begins with the stroke and image workflow server 106 creating and establishing an inbox 502 associated with a portable computing device 102a. The stroke and image workflow server 106 then creates and places one or more documents 504 in the inbox 502 that are scheduled for delivery to the portable computing device 102a. For example, the documents may be forms that the user of the portable computing device 102a needs to complete and return such as a medical information form. The stroke and image workflow server 106 automatically transfers 506 the documents 504 from the inbox 502 to a corresponding inbox (not shown) on the portable computing device 102a. Depending on the embodiment, the transfer of documents may occur at a number of different times: 1) once the documents 504 are placed in the inbox 502; 2) once the portable computing device 102a is coupled for communication with the stroke and image workflow server 106; 3) at periodic times, such as 15 minute intervals; or 4) various combinations of the above. Once the documents 504 have been transferred 506 to the portable computing device 102a, the portable computing device 102a is used to annotate the documents 504 and add strokes and other information to them. The annotations are added to the document 504 and the document 504 is stored back on the portable computing device 102a as depicted by line 508. In one embodiment, the information and the annotations added to documents 504 are backed up 510 off of the portable computing device 102a to a backup server 512. This transfer of documents can occur at times similar to those described above. Those skilled in the art will recognize that this step of backing up annotations made with the portable computing device 102a may be performed at regular intervals such as every 10 minutes or longer to preserve power of the portable computing device 102a. In yet another embodiment, the backup interval can be set by the user. Once the user has completed adding annotations to a particular document 504 and the document 504 is ready for submission, the user inputs a submit instruction and the annotated document 504 is transferred 514 from the portable computing device 102a to the stroke and image workflow server 106. Once the annotated document 504 is received at the stroke and image workflow server 106, it is stored, logged and the next step in the workflow process is determined. Based on the determination of where the document 504 should be sent to next, the stroke and image workflow server 106 transmits 516 the document to the determined device (e.g., the other computers 108). While FIG. 5 illustrates the plurality of computers as being computer 108, those skilled in the art will recognize that computer 108 represents a variety of different vendors capable of performing additional processing or annotation to the document 504.

State Diagrams

Referring now to FIG. 6, a state diagram 600 describing power management states of a device in an embodiment of invention is depicted. In one embodiment, the state diagram 600 is stored in the power management module 328. FIG. 6 illustrates an embodiment having five power management states 610, 620, 630, 640, 650 and also depicts transitions between the five power management states 610, 620, 630, 640, 650. However, in other embodiments, greater or fewer power management states may be used and the events causing transitioning between power management states 610, 620, 630, 640, 650 may differ from those shown by FIG. 6 and described below. For purposes of illustration, FIG. 6 describes power management states of a computing pad 202, as described above in conjunction with FIGS. 2A, 2B and 3; however, the state diagram 600 and state transitions described by FIG. 6 may also be applied to other types of portable computing device 102.

In the off state 610, input devices 212-216 other than a first input device 210, such as a first button, are inoperable. For example, in the off state 610, a first input device 210 that turns a power supply 330 included in a computing pad 202 on or off is operable while other input devices 212-216 of the computing pad 202 are inoperable. When the first input device 210 is accessed 602, the computing pad 202 enters a ready state 620 where the power supply 330 provides power to the display device 206, the input devices 212-216, the communication unit 306 and/or to other components of the computing pad 202. While in the ready state 620, the power supply 330 provides partial power to the processor 302 and the computing pad 202 is ready to receive input. For example, the processor 302 operates at half-power when the computing pad 202 is in the ready state 620. In one embodiment, the display device 206 also uses a reduced amount of power in the ready state 620. In one embodiment, the computing pad 202 transitions from the off state 610 to the ready state 620 responsive to a first type of access received by the first input device 210. For example, the computing pad 202 transitions from the off state 610 to the ready state 620 responsive to a user depressing a first button for at least a specified time interval.

In the ready state 620, the processor 302 determines whether a display queue included in the memory 304 is empty. If the display queue is not empty 604, the memory 304 includes data to be displayed by the display device 206 and the computing pad 202 transitions from the ready state 620 to an active state 630. In the active state 630, data is written to the display device 206 for presentation to a user and the display device 206 operates at full power. For example, in the active state 630, pixels of the display device 206 are being written. Further, in the active state 630, the amount of power used by the processor 302 is increased. For example, the processor 302 operates at half power in the ready state 620 and at full power in the active state 620.

In the active state 630, if the processor 302 determines that the display queue included in the memory 304 is empty 606, that is, if the processor 302 determines that no additional data is to be communicated to the display device 206, the computing pad 202 transitions back to the ready state 620. Thus, when data is not communicated to the display device 206, the processor 302 power consumption is reduced. In one embodiment, the display device 206 power consumption is also reduced.

While in the active state 630, if a first type of access is received 608 by the first input device 210, the computing pad 202 transitions from the active state 630 to the off state 610. For example, if the first input device 210 is a button and the button is depressed for at least a specified time interval, the computing pad 202 transitions from the active state 630 to the off state 610. In one embodiment, if the computing pad 202 experiences a forced shutdown, where the power supplied to different components of the computing pad 202 is interrupted, the computing pad 202 also transitions from the active state 630 to the off state 610. For example, if the power supply is less than or equal to a specified capacity, the computing pad 202 enters the off state 610 by shutting down applications operating on the computing pad 202 and interrupting power supplied to the input devices 212-218, the display device 206, the processor 302.

When in the active state 630, if a second type of input is received 612 by the first input device 210, the computing pad transitions from the active state 630 to a sleep state 640. For example, if the first input device 210 is a button that is depressed for less than a specified time interval, the computing pad 202 transitions from the active state 630 to the sleep state 640. In the sleep state 640, power is no longer provided, or a minimal amount of power is provided, to the communication unit 306, the display device 206, the input devices 212-218 and/or other components of the computing pad 202. While the computing pad 202 is in the sleep state 640, the processor 302 operates in a reduced power mode, drawing a minimal amount of power from the power supply. In one embodiment, the display device 206 presents an indication that the computing pad 202 is in the sleep state 640 when the sleep state 640 is initially entered or while the computing pad is in the sleep state 640. In one embodiment, data may still be visible on the display device 206 when the computing pad 202 is in the sleep state 640. Thus, while in the sleep state 640, the computing pad 202 consumes a minimal amount of power, extending the length of time the power supply 330 stores power.

While in the sleep state 640, if a first type of input is received 614 by the first input device 210, the computing pad transitions from the sleep state 640 to the off state 610. For example, if the first input device 210 is a button and the button is depressed for at least a specified time interval, the computing pad 202 transitions from the sleep state 640 to the off state 610. However, if a second type of input is received 616 by the first input device 210 when the computing pad 202 is in the sleep state 640, the computing pad 202 transitions from the sleep state 640 to the ready state 620. For example, if the first input device 210 is a button and the button is depressed for less than the specified time interval, the computing pad 202 transitions from the sleep state 640 to the ready state 620.

While in the ready state 620, if a first type of input is received 624 by the first input device 210, the computing pad 202 transitions from the ready state 620 to the off state 610. For example, if the first input device 210 is a button and the button is depressed for at least a specified time interval, the computing pad 202 transitions from the ready state 620 to the off state 610. If a second type of input is received 626 by the first input device 210 when the computing pad 202 is in the ready state 620, the computing pad 202 transitions from the ready state 620 to the sleep state 640. For example, if the first input device 210 is a button and the button is depressed for less than the specified time interval, the computing pad 202 transitions from the ready state 620 to the sleep state 640.

However, if no activity 618 is experienced by the computing pad 202 for a predetermined length of time while in the ready state 620, the computing pad 202 transitions form the ready state 620 to a dozing state 650. For example, if the computing pad 202 does not receive input via an input button 212-218, receive input via a stroke capture device 208, via the display device 206 or receive input from one or more accelerometers for several minutes, the computing pad 202 transitions from the ready state 620 to the dozing state 650. In one embodiment, the predetermined length of time is specified or modified by a user and stored in the memory 304.

In the dozing state 650, the display device 206 is modified to present data alerting a user that the computing pad 202 is in the dozing state 650. After notifying the user of the dozing state 650, minimal power, or no power, is supplied to the display device 206, the communication unit 306 and/or other components of the computing pad 202. While the computing pad 202 is in the dozing state 650, the processor 302 operates in a reduced power mode. For example, the processor 302 limits power usage to an amount sufficient to allow the processor 302 to transition from the dozing state 650 to the ready state 620 when detecting that an input is received by the computing pad 202. While in the dozing state 650, the processor 302 continues to execute a process monitoring one or more input devices 212-218, such as accelerometers and/or buttons, for input.

If the computing pad 202 receives 622 input from an input device 212-218, such as an accelerometer or a button, while in the dozing state 650, the computing pad 202 transitions to the ready state 620. Hence, if the computing pad 202 is physically moved while in the dozing state 650, an input device 212-218, such as an accelerometer, receives 622 input and the computing pad 202 transitions to the ready state 620, further described above. Additionally, if an input device 212-218, such as a button, receives 622 input while the computing pad 202 is in the dozing state 650, the computing pad 202 transitions to the ready state 620.

While in the dozing state 650, if a first type of input is received 628 by the first input device 210, the computing pad transitions from the dozing state 650 to the off state 610. For example, if the first input device 210 is a button and the button is depressed for at least a specified time interval, the computing pad 202 transitions from the dozing state 650 to the off state 610. If a second type of input is received 632 by the first input device 210 when the computing pad 202 is in the dozing state 620, the computing pad transitions from the dozing state 650 to the sleep state 640. For example, if the first input device 210 is a button and the button is depressed for less than the specified time interval, the computing pad 202 transitions from the dozing state 650 to the sleep state 640.

Transitioning between different power management states 610, 620, 630, 640, 650 depending on usage allows the computing pad 202 to more efficiently use power stored in the power supply 330. This extends the time during which the computing pad 202 is able to operate using the power supply 330. For example, a power management module 328 implementing the state machine 600 allows a computing pad 202 to be used for a longer period of time before recharging the power supply 330.

FIG. 7 illustrates a state diagram 700 of operating states of communication devices and transitions between the operating states according to an embodiment of the invention. FIG. 7 illustrates one embodiment of a state diagram 700 having communication device operating states 710, 720, 730, 740, 750, 760, 770 and also illustrates transitions between the communication device operating states 710, 720, 730, 740, 750, 760, 770. However, in other embodiments, a greater or fewer number of communication device operating states may be used and the events causing transitioning between communication device operating states 710, 720, 730, 740, 750, 760, 770 may differ from those shown by FIG. 7 and further described below. For purposes of illustration, FIG. 7 describes communication device operating states 710, 720, 730, 740, 750, 760, 770 of a device including two communication devices. However, the state diagram 700 and state transitions described by FIG. 7 are also applicable to a device having a greater number of communication devices.

For purposes of illustration, FIG. 7 describes communication device operating states 710, 720, 730, 740, 750, 760, 770 with respect to two communication devices 336, 338 included in the communication unit 306. In one embodiment, the communication devices 336, 338 comprise a first wireless transceiver and a second wireless transceiver. For example, the first communication device 336 is a WiFi transceiver and the second communication device is a 3G transceiver. In one embodiment, the first communication device 336 and the second communication device 338 consume different amounts of power, so the state diagram 700 modifies operation of the first communication device 336 and the second communication device 338 to minimize power consumption by the communication devices 336, 338.

For illustration, the state diagram 700 shown by FIG. 7 is described below with reference to a computing pad 202. However, the state diagram 700 is also applicable to different types of portable computing devices 102.

In the example further described below, the first communication device 336 has different operating modes: an off mode, a low mode and a high mode and consumes a different amount of power in the different operating modes. For example, the first communication device 336 consumes minimal, or no, power in the off mode, consumes a moderate amount of power in the low mode and consumes the relative maximum amount of power in the high mode. Thus, by altering the operating mode of the first communication device 336, the state diagram 700 modifies the amount of power consumed by the first communication device 336. While FIG. 7 shows an example where the second communication device 338 has two operating modes—an on mode and an off mode—in other embodiments the second communication device 338 may have multiple operating modes.

Further, FIG. 7 descries an embodiment where the first communication device 336 is the preferred communication device. For example, the first communication device 336 has a lower power consumption, even in the high mode, than the second communication device 338 so the state machine 700 attempts to communicate using the first communication device 336 as often as possible to more efficiently use power. However, in another embodiment communication using the second communication device 338 is preferable, so the state machine 700 would attempt to more frequently communicate using the second communication device 338. For example, if the first communication device 336 is a WiFi transceiver and the second communication device 338 is a 3G transceiver, the state machine 700 attempts to more frequently use the WiFi transceiver because of its improved power efficiency.

In one embodiment, the memory 304 of a portable computing device 102, such as a portable computing pad 202, includes a priority listing of communication devices 336, 338 specifying the order in which the state machine 700 uses different communication devices 336, 338. For example, the priority listing identifies different communication devices 336, 338 included in the communication unit 306 and ranks the different communication devices 336, 338 according to use preference. In addition to switching between use of a first communication device 336 and a second communication device 338, the priority listing may enable switching between use of additional communication devices. For example, the priority listing identifies a WiFi transceiver, a 3G transceiver, a near-field communication transceiver, a WiMax transceiver, a global position system (GPS) transceiver or transponder, a 4G transceiver, a BLUEOOTH® transceiver or any other suitable communication device and an order identifying a relative preference for use of the different communication devices. In one embodiment, the priority listing orders use of the communication devices based on power consumption by different communication devices. For example, the priority listing orders communication devices in ascending order of power consumption, so that the communication devices using lower amounts of power are attempted to be used first.

Referring to the state diagram 700 shown in FIG. 7, in the off/asleep state 710 minimal, or no, power is supplied to the first communication device 336 and the second communication device 338. For example, the first communication device 336 and the second communication device 360 operate in an off mode. In the off/asleep state 710, minimal, or no power, is supplied to other components of the computing pad 202, such as display device 206, one or more input devices 212-218, the processor 302 and/or other components of the computing pad 202.

Responsive to receiving an input, such as a first access to a first input device 210, the computing pad 202 determines whether to operate in an airplane mode. In one embodiment, the memory 306 includes data, such as a flag, indicating whether or not the computing pad 202 operates in an airplane state 720. In the airplane state, power is not supplied to the first communication device 336 or to the second communication device 338. Alternatively, an input device 212-218 is a toggle switch with a first position indicating that the computing device operates in the airplane state 720 and a second position indicating the computing device does not operate in the airplane state 720. While in the airplane state 720, additional components of the computing pad 202, such as the display device 206 and the processor 302, receive power, allowing the computing pad 202 to be used to process data but not to transmit or receive data. Hence, the airplane state 720 allows the computing pad 202 to be used for data processing in environments where data communication is not possible or is limited, such as during an airplane flight.

While in the asleep/off state 710, if the computing pad 202 receives an input and is configured to operate 702 in the airplane mode 720, the computing pad 202 transitions from the asleep/off state 710 to the airplane state 720 where the first communication device 336 and the second communication device 338 do not receive power, but other components of the computing pad 202, such as the display device 206 and processor 302, receive power.

However, if the computing pad 202 is in the asleep/off state 710 and not configured to operate 704 in the airplane state 720, when the computing pad 202 receives an input, the computing pad 202 transitions from the asleep/off state 710 to a wait state 730. In the wait state 730, the first communication device 336 operates in a low-power mode while the second communication device 338 remains in an off mode. For example, if the first communication device 336 is a WiFi transceiver and the second communication device 338 is a 3G transceiver, the WiFi transceiver operates in a low-power mode while the 3G transceiver remains in an off mode to conserve power. While the example described in conjunction with FIG. 7 addresses an implementation where the first communication device 336 has a higher priority than the second communication device 338, in another implementation where the second communication device 338 has a higher stored priority, the second communication device 338 operates in a low-power mode in the wait state 730 while the first communication device 336 is in an off state.

While in the wait state 730, if the computing pad 202 receives an input to operate 706 in the airplane state 720, the computing pad 202 transitions from the wait state 730 to the airplane state 720. For example, a user modifies data stored in the memory 306 indicating whether or not the computing pad 202 operates in the airplane state 720 or accesses an input device 212-218 where a first position of the input device 212-218 indicates that the computing device operates in the airplane state 720 and a second position of the input device 212-218 indicates the computing device does not operate in the airplane state 720. To transition from the wait state 730 to the airplane state 720, the computing pad 202 interrupts the power supplied to the first communication device 336 and to the second communication device 338, so the first communication device 336 and the second communication device 338 operate in an off mode while the remaining components of the computing pad 202 continue to receive power from the power supply 330.

While in the airplane state 720, if the computing pad 202 receives an input to not operate 708 in the airplane state 720, the computing pad 202 transitions from the airplane state 720 to the wait state 730. For example, a user modifies data stored in the memory 306 indicating whether or not the computing pad 202 operates in the airplane state 720 or accesses an input device 212-218 where a first position of the input device 212-218 indicates that the computing device operates in the airplane state 720 and a second position of the input device 212-218 indicates the computing device does not operate in the airplane state 720. In one embodiment, to transition from the airplane state 720 to the ready state 730, the computing pad 202 supplies power to the first communication device 336, so the first communication device 336 operates in a low-power mode. In one embodiment, the second communication device 228 continues to operate in an off mode; however, in an alternative embodiment, the second communication device 338 receives power and the first communication device 338 remains in an off mode.

In the wait state 730, responsive to a location services trigger 712, the computing pad 202 transitions from the wait state 730 to a second communication device locate state 750. For example, after a predetermined time interval the computing pad 202 transitions from the wait state 730 to the second communication device locate state 750 to obtain information describing the location of the computing pad 202 via the second communication device 338. As another example, responsive to receiving a type of input, such as a request for location identification, the computing pad 202 transitions from the wait state 730 to the second communication device locate state 750.

In the second communication device locate state 750, power is not supplied to the first communication device 336, or a minimal amount of power is supplied to the first communication device 336, while the second communication device 338 operates in an on mode. While in the second communication device locate state 750, the second communication device 338 receives data indicating the location of the computing pad 202. For example, the first communication device 336 is a WiFi transceiver and the second communication device 338 is a 3G transceiver. In the second communication device locate state 750, the WiFi transceiver is powered off and the 3G transceiver is powered up to operate in an on mode. The 3G transceiver then receives location information associated with the computing pad 202 from a 3G network. When the location information is received 714 by the second communication device 338 and stored in the memory 306, the computing pad 202 transitions from the second communication device locate state 750 to the wait state 730.

While in the wait state 730, if the computing pad 202 enters 716 an inbox or submits a document to a stroke and image workflow server 106, the computing pad 202 transitions from the wait state 730 to a first communication device test state 760. In the first communication device test state 760, the first communication device 336 is in a low power mode and the second communication device 338 is powered off. In the first communication device test state 760, the first communication device 336 determines whether it can access a first network for communication. For example, if the first communication device 336 is a WiFi transceiver and the second communication device is a 3G transceiver, in the first communication device test state 760, the WiFi transceiver determines whether it can connect to a WiFi network.

In the first communication device test state 760, if a connection to the first network is available 718 to the first communication device 336, the computing pad 202 transitions from the first communication device test state 760 to a first communication device synchronization state 770. In the first communication device synchronization state 770, the first communication device 336 receives power and operates in a high-power mode. For example, if the first communication device 336 is a WiFi transceiver and the second communication device is a 3G transceiver, in the first communication device synchronization state 770, the WiFi transceiver operates in a high-power mode to exchange data with a stroke and image workflow server 106 using a WiFi network. When synchronization of data between the computing pad 202 and the stroke and image workflow server 106 is completed 722, the computing pad 202 transitions from the first communication device synchronization state 770 to the wait state 730 by reducing the power consumed by the first communication device 336 so the first communication device 336 operates in a low power mode.

However, if a network connection is unavailable 724 to the first communication device 336 while in the first communication device test state 760 and the second communication device 338 is enabled, the computing pad 202 transitions from the first communication device test state 760 to a second communication device synchronization state 740. However, if the second communication device 338 is disabled, the computing pad 202 does not transition from the first communication device test state 760 to the second communication device synchronization state 740. For example, if a user has manually disabled or turned off the second communication device 338, the computing pad 202 does not transition to the second communication device synchronization state 740.

If the second communication device 338 is enabled and a network connection is unavailable 724 to the first communication device 336, the computing pad 202 transitions to the second communication device synchronization state 740. In the second communication device synchronization state 740, the first communication device 336 operates in a low power mode while the second communication device 338 operates in an on mode receiving power from the power supply 330. For example, if the first communication device 336 is a WiFi transceiver and the second communication device is a 3G transceiver, in the second communication device synchronization state 740, the WiFi transceiver operates in a low-power mode while the 3G transceiver operates in an on mode. Hence, in the second communication device synchronization state 740 the 3G transceiver exchanges data with the stroke and image workflow server 106 using a 3G network. When synchronization of data between the computing pad 202 and the stroke and image workflow server 106 is completed 726, the computing pad 202 transitions from the second communication device synchronization state 740 to the wait state 730 by interrupting the power supplied to the second communication device 338 so the second communication device 338 operates in an off mode and the first communication device 336 continues to operate in a low power mode.

By transitioning between power management states 610, 620, 630, 640, 650 and different communication device operating states 710, 720, 730, 740, 750, 760, 770, a computing pad 202, or another portable computing device 102, more efficiently consumes power. In one embodiment, a power management module includes both power management states 610, 620, 630, 640, 650 and communication device operating states 710, 720, 730, 740, 750, 760, 770 increasing the efficiency with which a computing pad 202, or other portable computing device 102, consumes power by modifying power consumption of various components of the computing pad 202 responsive to use of the computing pad 202.

The foregoing description of the embodiments of the present embodiment of invention has been presented for the purposes of illustration and description. It is not intended to be exhaustive or to limit the present embodiment of invention to the precise form disclosed. Many modifications and variations are possible in light of the above teaching. It is intended that the scope of the present embodiment of invention be limited not by this detailed description, but rather by the claims of this application. As will be understood by those familiar with the art, the present embodiment of invention may be embodied in other specific forms without departing from the spirit or essential characteristics thereof. Likewise, the particular naming and division of the modules, routines, features, attributes, methodologies and other aspects are not mandatory or significant, and the mechanisms that implement the present embodiment of invention or its features may have different names, divisions and/or formats. Furthermore, as will be apparent to one of ordinary skill in the relevant art, the modules, routines, features, attributes, methodologies and other aspects of the present embodiment of invention can be implemented as software, hardware, firmware or any combination of the three. Also, wherever a component, an example of which is a module, of the present embodiment of invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present embodiment of invention is in no way limited to implementation in any specific programming language, or for any specific operating system or environment. Accordingly, the disclosure of the present embodiment of invention is intended to be illustrative, but not limiting, of the scope of the present embodiment of invention, which is set forth in the following claims.

What is claimed is:

1. A method for managing power usage of one or more devices, the method comprising:
   responsive to a first input received at a first input device, a first amount of power supplied from a power supply to a processor and power supplied from the power supply to a display device, a second input device and a communication unit in a ready state, transitioning from an off state where the power supply does not supply power to the display device, the communication unit, the second input device and the processor to the ready state, wherein the communication unit comprises a plurality of transceivers including a wireless transceiver;
   transitioning from the ready state to a dozing state responsive to the second input device and the display device not receiving a second input for a predetermined length of time, ceasing to supply power from the power supply to the communication unit in the dozing state and decreasing, but not ceasing, power supplied to the processor in the dozing state;
   operating in a wait state by supplying power to the display device, the second input device and the processor while providing a low amount of power from the power supply to a first transceiver included in the communication unit and not supplying power to a second transceiver included in the communication unit; and
   responsive to receiving a third input to access an inbox or to submit a document while operating in the wait state, operating in a first transceiver test state by providing the low amount of power from the power supply to the first transceiver and not supplying power to the second transceiver.

2. The method of claim 1, further comprising:
   transitioning from the ready state to an active state responsive to determining that a memory includes data for display using the display device, writing the data for display to the display device and increasing the power supplied to the processor from the first amount to a second amount in the active state;
   transitioning from the ready state to the off state responsive to the first input device receiving a first type of input;
   transitioning from the ready state to a sleep state responsive to the first input device receiving a second type of input, ceasing to supply power from the power supply to the display device, the communication unit and the second input device and decreasing power supplied to the processor in the sleep state;
   transitioning from the active state to the off state responsive to the first input device receiving the first type of input while in the active state;
   transitioning from the active state to the sleep state responsive to the first input device receiving the second type of input while in the active state; and
   transitioning from the active state to the ready state responsive to determining that there is no data to display using the display device.

3. The method of claim 2, further comprising:
   transitioning from the dozing state to the ready state responsive to the second input device receiving the second input while in the dozing state;
   transitioning from the dozing state to the sleep state responsive to the first input device receiving the second type of input while in the dozing state, ceasing to supply power from the power supply to the display device, the communication unit and the second input device and decreasing power supplied to the processor in the sleep state; and
   transitioning from the dozing state to the off state responsive to the first input device receiving the first type of input while in the dozing state.

4. The method of claim 3, further comprising:
   transitioning from the sleep state to the off state responsive to the first input device receiving the first type of input while in the sleep state; and
   transitioning from the sleep state to the ready state responsive to the first input device receiving the second type of input while in the sleep state.

5. The method of claim 1, further comprising:
   operating in an asleep/off communication state where power is not supplied from the power supply to the display device, the second input device, the processor, the first transceiver and to the second transceiver;

responsive to receiving a fourth input, determining whether to operate in an airplane state;

responsive to determining to operate in the airplane state, operating in the airplane state by supplying power to the display device, the second input device and the processor while not supplying power to the first transceiver and to the second transceiver; and responsive to determining not to operate in the airplane state, operating in the wait state by supplying power to the display device, the second input device and the processor while providing the low amount of power from the power supply to the first transceiver and not supplying power to the second transceiver.

6. The method of claim 5, further comprising:

responsive to a location services trigger while operating in the wait state, operating in a second transceiver locate state by ceasing power supplied from the power supply to the first transceiver and supplying power to the second transceiver; and responsive to receiving location information via the second transceiver, operating in the wait state by ceasing power supplied from the power supply to the second transceiver and providing the low amount of power from the power supply to the first transceiver.

7. The method of claim 5, further comprising:

while in the first transceiver test state, determining whether a first network is accessible to the first transceiver;

responsive to determining that the first network is accessible to the first transceiver, operating in a first transceiver synchronization state by increasing the power from the power supply to the first transceiver and transmitting data to the first network using the first transceiver;

responsive to completing transmitting the data to the first network using the first transceiver, operating in the wait state by reducing power supplied from the power supply to the first transceiver to the low amount of power while not supplying power to the second transceiver;

responsive to determining that the first network is inaccessible to the first transceiver, determining whether the second transceiver is enabled;

responsive to determining that the second transceiver is enabled, operating in a second transceiver synchronization state by ceasing power supplied from the power supply to the first transceiver, and supplying power from the power supply to the second transceiver;

transmitting the data to a second network using the second transceiver; and responsive to completing transmitting the data to the second network using the second transceiver, operating in the wait state by ceasing power supplied from the power supply to the second transceiver and providing the low amount of power from the power supply to the first transceiver.

8. A method for managing power usage of one or more devices, the method comprising:

operating in an asleep/off communication state where power is not supplied from a power supply to a display device, a processor, a first transceiver and a second transceiver;

responsive to receiving a first input, operating in a wait state by supplying power to the display device and the processor while providing a low amount of power from the power supply to the first transceiver and not supplying power to the second transceiver;

responsive to receiving a second input to access an inbox or to submit a document while operating in the wait state, operating in a first transceiver test state by providing the low amount of power from the power supply to the first transceiver and not supplying power to the second transceiver;

responsive to a location services trigger while operating in the wait state, operating in a second transceiver locate state by ceasing power supplied from the power supply to the first transceiver and supplying power to the second transceiver; and responsive to the second transceiver receiving location information, operating in the wait state by ceasing power supplied from the power supply to the second transceiver and providing the low amount of power from the power supply to the first transceiver.

9. The method of claim 8, wherein operating in the wait state comprises:

determining whether to operate in an airplane state;

responsive to determining to operate in the airplane state, operating in the airplane state by supplying power to the display device and the processor while not supplying power to the first transceiver and to the second transceiver; and responsive to determining not to operate in the airplane state, operating in the wait state.

10. The method of claim 8, wherein the location services trigger is a request for location identification.

11. The method of claim 8, wherein operating in the first transceiver test state further comprises:

determining whether a first network is accessible to the first transceiver;

responsive to determining that the first network is accessible to the first transceiver, operating in a first transceiver synchronization state by increasing the power from the power supply to the first transceiver;

transmitting data to the first network using the first transceiver; and responsive to completing transmitting the data to the first network using the first transceiver, operating in the wait state by reducing power supplied from the power supply to the first transceiver to the low amount of power while not supplying power to the second transceiver.

12. The method of claim 11, further comprising:

responsive to determining that the first network is inaccessible to the first transceiver, determining whether the second transceiver is enabled;

responsive to determining that the second transceiver is enabled, operating in a second transceiver synchronization state by ceasing power supplied from the power supply to the first transceiver and supplying power from the power supply to the second transceiver;

transmitting the data to a second network using the second transceiver; and responsive to completing transmitting the data to the second network using the second transceiver, operating in the wait state by ceasing power supplied from the power supply to the second transceiver and providing the low amount of power from the power supply to the first transceiver.

13. The method of claim 8, further comprising:

responsive to a third input received at a first input device, a first amount of power supplied from the power supply to the processor and power supplied from the power supply to the display device and to a second input device in a ready state, transitioning from an off state where the power supply does not supply power to the display device, the second input device and the processor to the ready state;

transitioning from the ready state to an active state responsive to determining that a memory includes data for display using the display device, writing the data for display to the display device and increasing the power supplied to the processor from the first amount to a second amount in the active state;

transitioning from the ready state to the off state responsive to the first input device receiving a first type of input;

transitioning from the ready state to a sleep state responsive to the first input device receiving a second type of input, the power supply ceasing to supply power to the display device and the second input device while decreasing power supplied to the processor in the sleep state; and transitioning from the ready state to a dozing state responsive to the second input device and the display device not receiving a fourth input for a predetermined length of time, the power supply ceasing to supply power to the first transceiver and the second transceiver while decreasing power supplied to the processor in the dozing state.

14. The method of claim 13, further comprising:

transitioning from the dozing state to the ready state responsive to the second input device receiving the fourth input while in the dozing state;

transitioning from the dozing state to the sleep state responsive to the first input device receiving the second type of input while in the dozing state;

transitioning from the dozing state to the off state responsive to the first input device receiving the first type of input while in the dozing state;

transitioning from the sleep state to the off state responsive to the first input device receiving the first type of input while in the sleep state;

transitioning from the sleep state to the ready state responsive to the first input device receiving the second type of input while in the sleep state;

transitioning from the active state to the off state responsive to the first input device receiving the first type of input while in the active state;

transitioning from the active state to the sleep state responsive to the first input device receiving the second type of input while in the active state; and transitioning from the active state to the ready state responsive to determining that there is no data to display using the display device.

15. A system for managing power usage of one or more devices, the system comprising:

one or more processors, the processors being configured to:

responsive to a first input received at a first input device, a first amount of power supplied from a power supply to a processor and power supplied from the power supply to a display device, a second input device and a communication unit in a ready state, transition from an off state where the power supply does not supply power to the display device, the communication unit, the second input device and the processor to the ready state, wherein the communication unit comprises a plurality of transceivers including a wireless transceiver;

transition from the ready state to a dozing state responsive to the second input device and the display device not receiving a second input for a predetermined length of time, ceasing to supply power from the power supply to the communication unit in the dozing state and decreasing, but not ceasing power supplied to the processor in the dozing state;

operate in a wait state by supplying power to the display device, the second input device and the processor while providing a low amount of power from the power supply to a first transceiver included in the communication unit and not supplying power to a second transceiver included in the communication unit; and responsive to receiving a third input to access an inbox or to submit a document while operating in the wait state, operate in a first transceiver test state by providing the low amount of power from the power supply to the first transceiver and not supplying power to the second transceiver.

16. The system of claim 15, wherein the one or more processors are further configured to:

transition from the ready state to an active state responsive to determining that a memory includes data for display using the display device, writing the data for display to the display device and increasing the power supplied to the processor from the first amount to a second amount in the active state;

transition from the ready state to the off state responsive to the first input device receiving a first type of input;

transition from the ready state to a sleep state responsive to the first input device receiving a second type of input, ceasing to supply power from the power supply to the display device, the communication unit and the second input device and decreasing power supplied to the processor in the sleep state;

transition from the active state to the off state responsive to the first input device receiving the first type of input while in the active state;

transition from the active state to the sleep state responsive to the first input device receiving the second type of input while in the active state; and transition from the active state to the ready state responsive to determining that there is no data to display using the display device.

17. The system of claim 16, wherein the one or more processors are further configured to:

transition from the dozing state to the ready state responsive to the second input device receiving the second input while in the dozing state;

transition from the dozing state to the sleep state responsive to the first input device receiving the second type of input while in the dozing state, ceasing to supply power from the power supply to the display device, the communication unit and the second input device and decreasing power supplied to the processor in the sleep state; and transition from the dozing state to the off state responsive to the first input device receiving the first type of input while in the dozing state.

18. The system of claim 17, wherein the one or more processors are further configured to:

transition from the sleep state to the off state responsive to the first input device receiving the first type of input while in the sleep state; and transition from the sleep state to the ready state responsive to the first input device receiving the second type of input while in the sleep state.

19. The system of claim 15, wherein the one or more processors are further configured to:

operate in an asleep/off communication state where power is not supplied from the power supply to the display device, the second input device, the processor, the first transceiver and to the second transceiver;

responsive to receiving a fourth input, determine whether to operate in an airplane state;

responsive to determining to operate in the airplane state, operate in the airplane state by supplying power to the display device, the second input device and the processor while not supplying power to the first transceiver and to the second transceiver; and responsive to determining not to operate in the airplane state, operate in the wait state by supplying power to the display device, the second input device and the processor while providing the low amount of power from the power supply to the first transceiver and not supplying power to the second transceiver.

20. The system of claim 19, wherein the one or more processors are further configured to:

responsive to a location services trigger while operating in the wait state, operate in a second transceiver locate state by ceasing power supplied from the power supply to the first transceiver and supplying power to the second transceiver; and responsive to receiving location information via the second transceiver, operate in the wait state by ceasing power supplied from the power supply to the second transceiver and providing the low amount of power from the power supply to the first transceiver.

* * * * *